US010694433B2

(12) United States Patent
Comstock (10) Patent No.: US 10,694,433 B2
(45) Date of Patent: Jun. 23, 2020

(54) RADIO ACCESS NETWORK TRAFFIC OFFLOAD INDICATOR (71) Applicant: Kyocera Corporation, Kyoto (JP)

(72) Inventor: David Comstock, San Diego, CA (US)

(73) Assignee: Kyocera Corporation, Kyoto (JP)

(*) Notice: Subject to any disclaimer, the term of this patent is extended or adjusted under 35 U.S.C. 154(b) by 231 days.

(21) Appl. No.: 15/513,085

(22) PCT Filed: Sep. 25, 2015

(86) PCT No.: PCT/US2015/052425
§ 371 (c)(1),
(2) Date: Mar. 21, 2017

(87) PCT Pub. No.: WO2016/053804
PCT Pub. Date: Apr. 7, 2016

(65) Prior Publication Data
US 2017/0251410 A1 Aug. 31, 2017

Related U.S. Application Data (60) Provisional application No. 62/059,792, filed on Oct. 3, 2014.

(51) Int. Cl.
H04W 36/00 (2009.01)
H04W 36/14 (2009.01)
(Continued)

(52) U.S. Cl.
CPC ....... H04W 36/0066 (2013.01); H04W 36/14 (2013.01); H04W 36/22 (2013.01); H04W 84/12 (2013.01); H04W 88/06 (2013.01)

(58) Field of Classification Search
CPC ..... H04W 36/00; H04W 36/14; H04W 36/22; H04W 36/0066; H04W 88/06; H04W 84/12
See application file for complete search history.

(56) References Cited

U.S. PATENT DOCUMENTS

2013/0242783 A1* 9/2013 Horn ..................... H04W 24/10
370/252
2013/0272163 A1 10/2013 Qiang
(Continued)

FOREIGN PATENT DOCUMENTS

WO WO2014-158279 A1 10/2014

OTHER PUBLICATIONS

3rd Generation Partnership Project; "LTE; E-UTRAN; S1 Application Protocol (S1AP)"; 3GPP TS 36.413 V.11.4.0 Release 11; Jun. 27, 2013; Valbonne, FR.

Primary Examiner — Kyaw Z Soe (57) ABSTRACT

Where a user equipment (UE) device transfers communication from a first radio access network (RAN) device to a second RAN device, the first RAN device receives a traffic offload indicator indicating that resources being used for data traffic for the UE device through the first RAN device are released because the data traffic communication has been transferred to the second RAN device. The first RAN device provides assistance parameters to the UE device that are determined at least partially based on the information that the data traffic communication has been transferred to the second RAN device. The UE device uses the assistance parameters in determining when to transfer data traffic RAN between the first RAN device and the second RAN device.

16 Claims, 6 Drawing Sheets (51) Int. Cl.
*H04W 36/22* (2009.01)
*H04W 88/06* (2009.01)
*H04W 84/12* (2009.01)

(56) References Cited

U.S. PATENT DOCUMENTS

| | | | |
|---|---|---|---|
| 2014/0003241 A1* | 1/2014 | Kim | H04W 36/22 |
| | | | 370/235 |
| 2014/0050086 A1* | 2/2014 | Himayat | H04N 21/2365 |
| | | | 370/230 |
| 2014/0211626 A1* | 7/2014 | Liu | H04W 28/08 |
| | | | 370/235 |
| 2015/0003314 A1* | 1/2015 | Kim | H04W 68/02 |
| | | | 370/312 |
| 2015/0003435 A1* | 1/2015 | Horn | H04L 5/0058 |
| | | | 370/338 |
| 2015/0195743 A1* | 7/2015 | Sirotkin | H04W 28/08 |
| | | | 370/235 |
| 2016/0029282 A1* | 1/2016 | Lee | H04W 36/14 |
| | | | 370/332 |
| 2016/0323926 A1* | 11/2016 | Gao | H04W 76/10 |

* cited by examiner

RADIO ACCESS NETWORK TRAFFIC OFFLOAD INDICATOR

CLAIM OF PRIORITY

The present application claims priority to Provisional Application No. 62/059,792 entitled "Method Of Indicating Offloaded Traffic To A 3GPP RAN", filed Oct. 3, 2014, assigned to the assignee hereof and hereby expressly incorporated by reference in its entirety.

FIELD

This invention generally relates to wireless communications and more particularly to radio access network (RAN) traffic offload indicators.

BACKGROUND

Wireless communication systems use radio access networks (RAN) having communication stations (base stations, eNodeBs, eNBs, access points, APs) to provide geographical service areas where wireless communication user equipment devices (UE devices) communicate with the communication station providing the particular geographical service area in which the UE devices are located. In some situations, multiple RANs provide geographical service areas that at least partially overlap. Where a UE device has the capability to communicate within either RAN, it is sometimes advantageous to offload data traffic from one RAN to another RAN. For example, offloading traffic from a cellular RAN to a wireless local area network (WLAN) RAN can be performed to avoid congestion and maintain a desired level of service on the cellular RAN.

SUMMARY

Where a user equipment (UE) device transfers communication from a first radio access network (RAN) device to a second RAN device, the first RAN device receives a traffic offload indicator indicating that resources being used for data traffic for the UE device through the first RAN device are released because the data traffic communication has been transferred to the second RAN device. The first RAN device provides assistance parameter thresholds to the UE device that are determined at least partially based on the information that data traffic communication has been transferred to the second RAN device. The UE device uses the assistance parameter thresholds in determining when to transfer data traffic between the first RAN device and the second RAN device.

DETAILED DESCRIPTION

Figure 1:
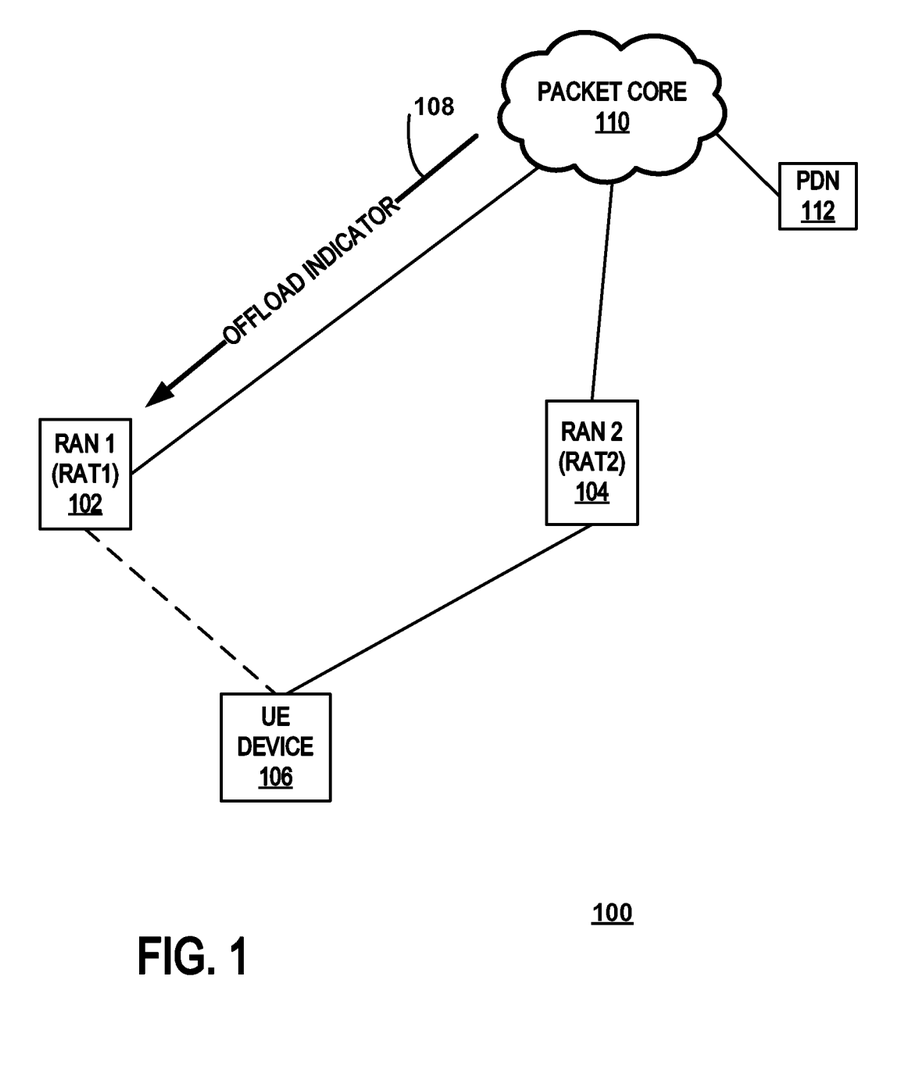
FIG. 1 is a block diagram of a communication system that supports multiple Radio Access Technologies (RATs) for an example where traffic is offloaded from a first radio access network (RAN) to a second RAN when a user equipment (UE) device transfers from a first RAT to a second RAT.

FIG. 1 is a block diagram of a communication system 100 that supports multiple Radio Access Technologies (RATs) for an example where traffic is offloaded from a first radio access network (RAN) 102 to a second RAN 104 when a user equipment (UE) device 106 transfers from a first RAT to a second RAT. For the example, the first RAN 102 receives a traffic offload indicator 108 indicating that traffic has been offloaded to the second RAN 104 and the resources in the first RAN are being released. Equipment, such as an eNB, in the first RAN determines assistance parameter thresholds partially based on the information that the traffic has been offloaded. The assistance parameter thresholds are provided to the UE device 106 which uses the assistance parameter thresholds to select a RAN. Therefore, the first RAN 102 manages the migration of the UE devices between RANs at least partially based on the information regarding the offloading of traffic.

The packet core 110 in the system 100 includes equipment and backhaul that connects the first RAN 102 and the second RAN 104 to packet data network (PDN) services 112 such as the Internet. The packet core 110 can be any combination of entities that route data and control signals to establish and manage communication between the RANs and PDN services 112. In one example, as discussed below in further detail, the packet core 110 is an Evolved Packet Core (EPC) that applies a System Architecture Evolution (SAE) core network architecture used in revisions of The Third-Generation Partnership Project Long-Term Evolution (3GPP LTE) communication specification. As discussed herein, a RAN includes the equipment that implements a Radio Access Technology (RAT) that is accessible by UE devices via wireless communication over an air interface. A Radio Access Technology (RAT) is the underlying physical connection method for a radio based communication network. A RAN includes a base station, eNB, access point or other similar device for wirelessly communicating with UE devices. For the examples herein, the first RAN implements a cellular RAT such as one that operates in accordance with the 3GPP specification and the second RAN implements a non-cellular RAT such as a WiFi RAT used in Wireless Local Area Networks (WLANs).

For the example of FIG. 1, the UE device 106 is receiving wireless service from the first RAN when it determines that traffic should be offloaded from the first RAN to the second RAN. When certain criteria are met, the UE device establishes a connection through the second RAN to the packet core. Messages are exchanged through the packet core such that the traffic offload indicator 108 is sent to the first RAN indicating that the resources used for the communication with the UE device through the first RAN are released and that the traffic has been offloaded. Using the information that the traffic has been offloaded, the first RAN updates the parameters used by the UE device for determining when the criteria have been met to change RANs/RATs and provides the parameters to the UE device 106.

The techniques discussed herein are particularly useful in systems where one RAN is a 3GPP access and the other RAN is a non-3GPP access. 3GPP accesses include access technologies that are specified by the 3GPP and include GPRS, UMTS, EDGE, HSPA, LTE and LTE Advanced. Non-3GPP accesses are technologies that are not specified by the 3GPP and include technologies such as cdma2000, WiFi and fixed networks. 3GPP specifies two classes of non-3GPP access technologies with different security mechanisms including trusted accesses and non-trusted accesses. For the examples herein, the non-3GPP access is a trusted access.

Figure 2:
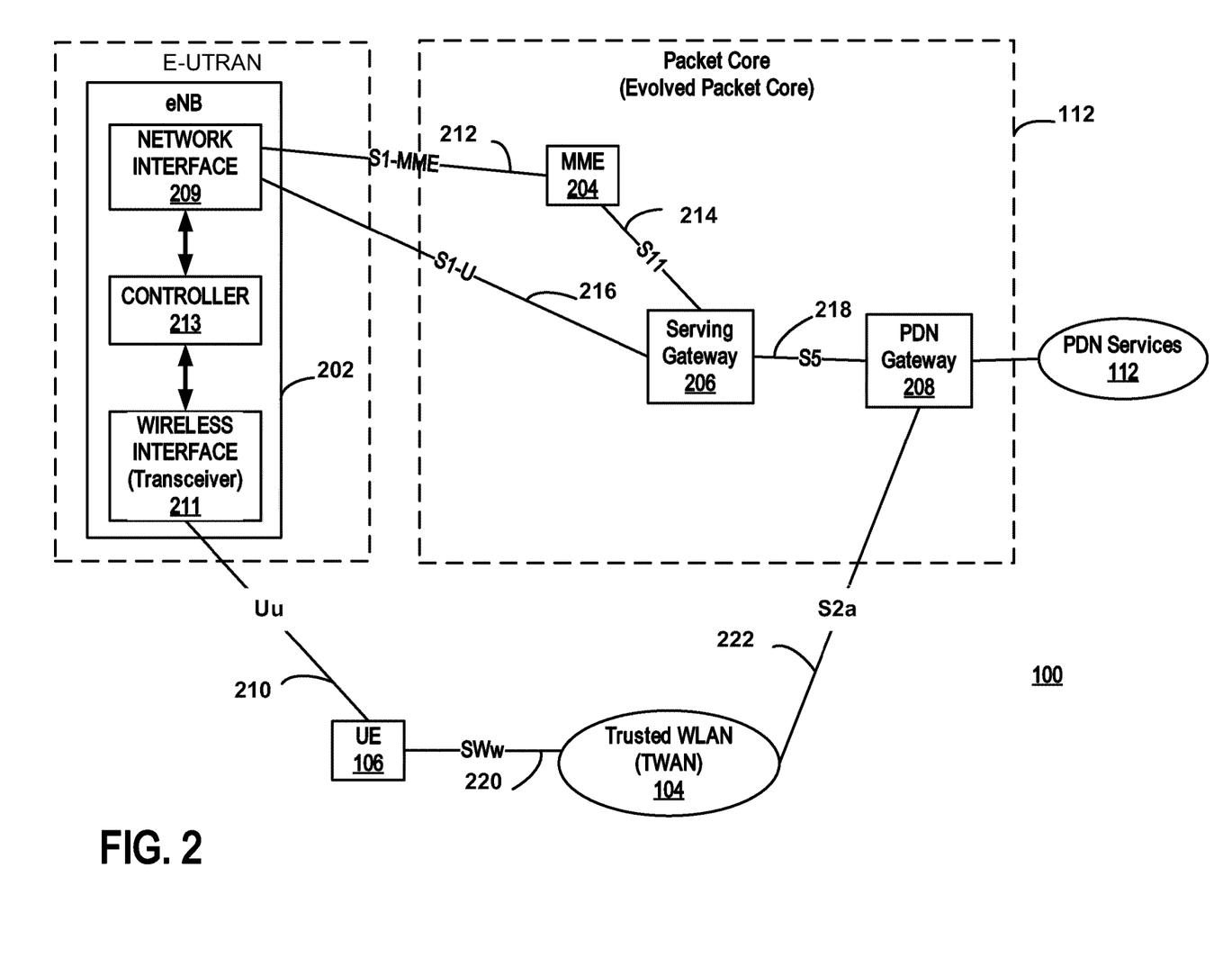
FIG. 2 is a block diagram of the communication system for the example where the packet core is an evolved packet core (EPC), the first RAN operates in accordance with at least one revision of the 3GPP LTE specification, and the second RAN is a trusted WLAN (TWAN) operating in accordance with a communication specification other than a 3GPP communication specification.

FIG. 2 is a block diagram of the communication system 100 for the example where the packet core 112 is an evolved packet core (EPC), the first RAN 102 operates in accordance with at least one revision of the 3GPP LTE specification, and the second RAN 102 is a trusted WLAN (TWAN) operating in accordance with a communication specification other than a 3GPP communication specification. For the example, the EPC 112 includes an eNB 202, a Mobility Management Entity (MME) 204, serving Gateway 206, Packet Data Network (PDN) Gateway 208, and as well as other equipment and entities. In the interest of brevity and clarity, some of the functional blocks and components have been omitted from FIG. 2. For example, the Policy Control and Charging Rules Function (PCRF), the 3GPP Authentication, Authorization and Accounting (AAA) server and the Home Subscriber Server (HSS) are not shown in the figure.

The Evolved Node B 202 is a fixed transceiver station, sometimes referred to as a base station, an eNodeB or eNB, which may include some controller functions in some circumstances. The eNB 202 is connected to the network through a backhaul which may include any combination of wired, optical, and/or wireless communication channels. A network interface 209 in the eNB 202 facilitates communication through the backhaul using the appropriate communication interface and protocol.

The eNB 202 includes a wireless interface (transceiver) 211 for communicating with the UE devices over the Uu interface 210 that uses the LTE air interface and supports Radio Resource Control (RRC) control signaling. The LTE air interface uses orthogonal frequency-division multiplexing (OFDM) on the downlink and single-carrier frequency-division multiple access (SC-FDMA) on the uplink. The transceiver 211 exchanges wireless signals with the UE device 102. Transmissions from the eNB and from the UE devices are governed by a communication specification that defines signaling, protocols, and parameters of the transmission. The communication specification may provide strict rules for communication and may also provide general requirements where specific implementations may vary while still adhering to the communication specification. Although the discussion herein is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical channels. The transceiver 211, therefore, includes at least a downlink transmitter for transmitting downlink signals and an uplink receiver for receiving uplink signals. The eNB also includes a controller 213 that performs, in conjunction with the other eNB components, the functions described herein as well as facilitating the overall functionality of the eNB 202. The eNB 202, therefore, includes a transceiver 211, a controller 213, and a network interface 209 as well as other components and circuitry (not shown) such as memory, for example.

The Mobility Management Entity (MME) 204 is a control-node for the LTE access-network. The MME 204 performs functions such as idle mode UE (User Equipment) paging and tagging procedures including retransmissions. The MME facilitates bearer activation and deactivation process and also selects the serving gateway that will be used by a UE device. The MME 204 communicates with the eNB 202 over a S1-MME interface 212 using S1 Application Protocol (S1-AP) control data. Control data is exchanged between the MME and the serving gateway using GPRS Tunneling Protocol over an S11 interface 214.

The serving gateway 206 routes and forwards user data packets and facilitates inter-eNodeB handovers as well as mobility between LTE and other 3GPP technologies. The serving gateway 206 also manages and stores UE contexts such as parameters of the IP bearer service and network internal routing information. The serving gateway 206 communicates with the eNB 202 using GPRS Tunneling Protocol over the S1-U interface 216.

The PDN Gateway 208 provides connectivity between the UE device 106 and external packet data networks 112 by being the point of exit and entry of traffic for the UE device 106. A UE device 106 may have simultaneous connectivity with more than one PDN gateway for accessing multiple PDNs. The PDN gateway performs policy enforcement, packet filtering for each user, charging support, lawful interception and packet screening. The PDN gateway facilitates mobility between 3GPP and non-3GPP technologies. Control data and user data is transported between the PDN gateway and the serving gateway using GPRS Tunneling Protocol over an S5 interface 218.

The wireless user equipment communication device (UE device) 106 may be referred to as a mobile device, wireless device, wireless communication device, mobile wireless device, UE, UE device, as well as by other terms. The UE device 106 includes electronics and code for communicating with eNBs, base stations, wireless access points and, sometimes, with other UE devices in device-to-device (D2D) configurations. The UE devices include devices such as cell phones, personal digital assistants (PDAs), wireless modem cards, wireless modems, televisions with wireless communication electronics, and laptop and desktop computers, as well as other devices. The combination of wireless communication electronics with an electronic device, therefore, may form a UE device 106. For example, a UE device 106 may include a wireless modem connected to an appliance, computer, television, or other device.

The UE device 106 accesses the non-3GPP network (TWAN 104) through an SWw interface 220 such as an air interface operating in accordance with an IEEE 802.11 standard. The UE device 106, therefore, includes electronics and code to facilitate communication through the SWw interface 220.

The non-3PGG network (TWAN) 104 communicates with the PDN gateway over an S2a interface 222. The TWAG uses GPRS tunneling for communication with the PDN gateway 208 and establishes a GTPv2, PMIP or MIP tunnel to the PDN gateway 208 in the EPC core for all trusted traffic.

Figure 3:
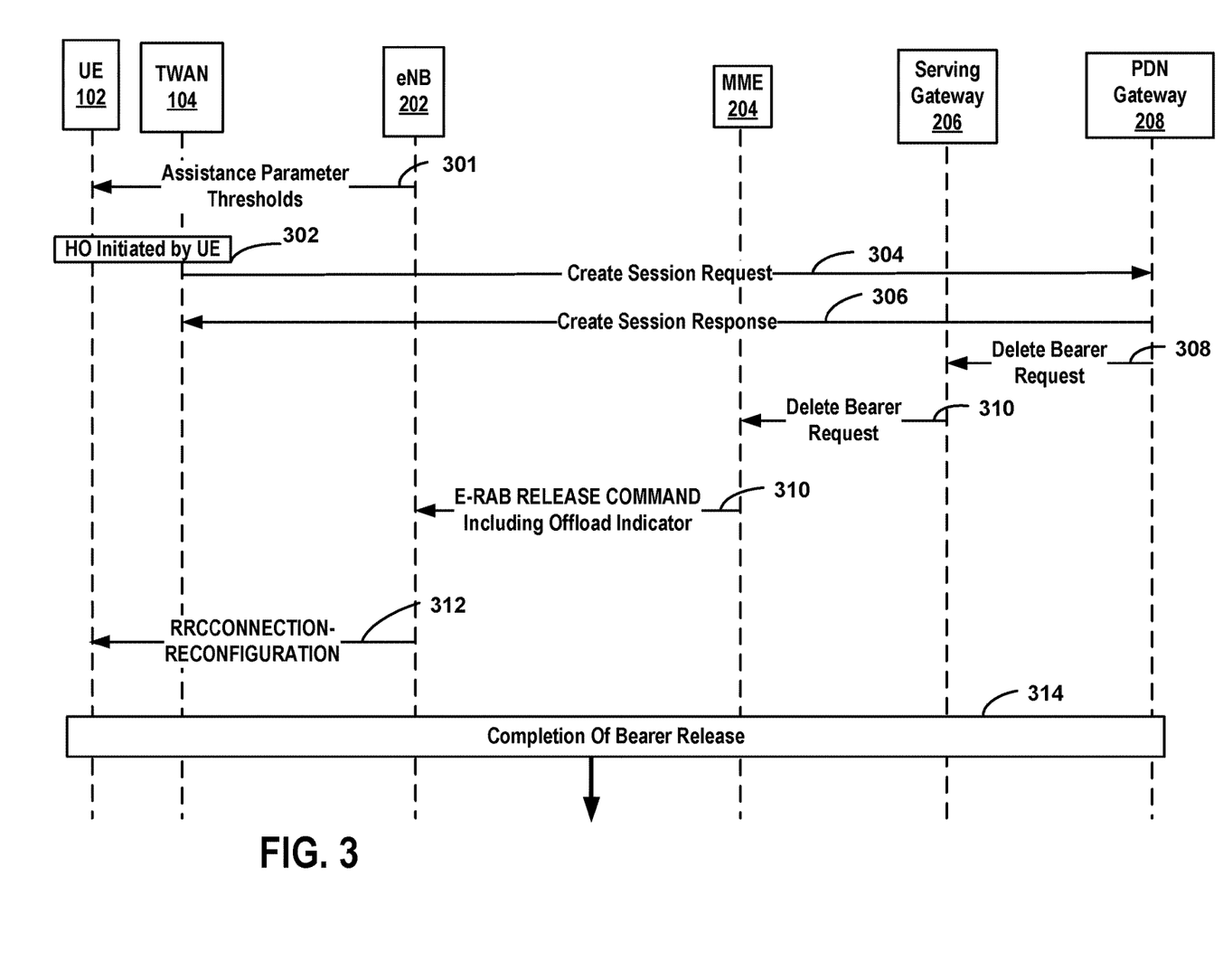
FIG. 3 is an illustration of a signaling sequence for a procedure for offloading traffic from a 3GPP RAN to a non-3GPP RAN.

FIG. 3 is an illustration of a signaling sequence for a procedure for offloading traffic from 3GPP RAN to a non-3GPP RAN. For the example of FIG. 3, the non-3PGG RAN is a (TWAN) 104 and the messages and signals are transmitted over the communication interfaces described with reference to FIG. 2. In the interest of clarity and brevity, FIG. 3 does not necessarily show all the signaling and events associated with the procedure.

At event 301, eNB 202 provides assistance parameter thresholds to UE 102 to be used to facilitate traffic steering decisions.

At event 302, the UE device initiates moving some of its traffic from eNB 202 to the non-3GPP RAN. For the example, the UE device exchanges signals over the WLAN interface 220 with the TWAN 104 indicating that the TWAN 104 should establish a connection with the PDN Gateway through the TWAN 104.

At transmission 304, the TWAN 104 sends a CREATE SESSION REQUEST message to the PDN Gateway to initiate a session for the UE traffic to be routed through the TWAN 104. At transmission 306, the PDN Gateway sends a CREATE SESSION RESPONSE to complete the establishment of the session.

After the session is established, the PDN Gateway 208 initiates release of the 3GPP session for this traffic that was routed through the 3GPP RAN. A bearer is an aggregate of multiple IP flows that have similar QoS requirements that are routed together through 3GPP network. The resources that were previously used in the 3GPP RAN for the bearers for the UE device that have been offloaded to WLAN are released. At transmission 308, the PDN Gateway sends a DELETE BEARER REQUEST message to the serving gateway 206. At transmission 310, the Serving GW forwards the DELETE BEARER REQUEST message to the MME 204. In accordance with conventional techniques, the DELETE BEARER REQUEST includes a "RAT changed from 3GPP to Non-3GPP" indicator indicating the reason for the release of the bearers.

At transmission 310, the MME 204 sends the traffic offload indicator 108 to the eNB 202. For the example herein, the MME 204 sends an E-RAB RELEASE COMMAND 51-AP message to the eNB to request the release of the bearers where the message includes the "RAT changed from 3GPP to Non-3GPP". The "RAT changed from 3GPP to Non-3GPP" indicator, therefore, is an example of an offload indicator 108.

At transmission 312, the eNB instructs the UE device 106 to release the bearers. For the example, the eNB sends a RRCCONNECTIONRECEONFIGURATION message in accordance with known 3GPP techniques that identifies the bearers to be released.

At events 314, the UE device and 3GPP network complete the release of the bearers. For example, the UE device transmits to the eNB, an ULINFORMATIONTRANSFER message with a bearer context accepted indicator. The eNB transmits S1-AP messages invoking the MME the sends delete bearer response message to the serving gateway which is forwarded to the PDN gateway to complete the bearer release.

Therefore, the above example of the process for offloading traffic from the bearer resources is similar to conventional techniques except that the eNB is notified that bearers are being released because the UE has transitioned to a non-3GPP RAN. Such an indication facilitates a more efficient management of resources. In one example, the eNB sets the RAN assistance parameter thresholds based on the information regarding the release of bearers. By monitoring which resources have been released because of UE device transitions to non-3GPP RANs, the eNB can set thresholds to manage migration from the 3GPP RAN to the non-3GPP RAN and vice versa. The RAN assistance parameter thresholds are sent to the UE device and used by the UE device to determine when to transition to another RAN.

Figure 4:
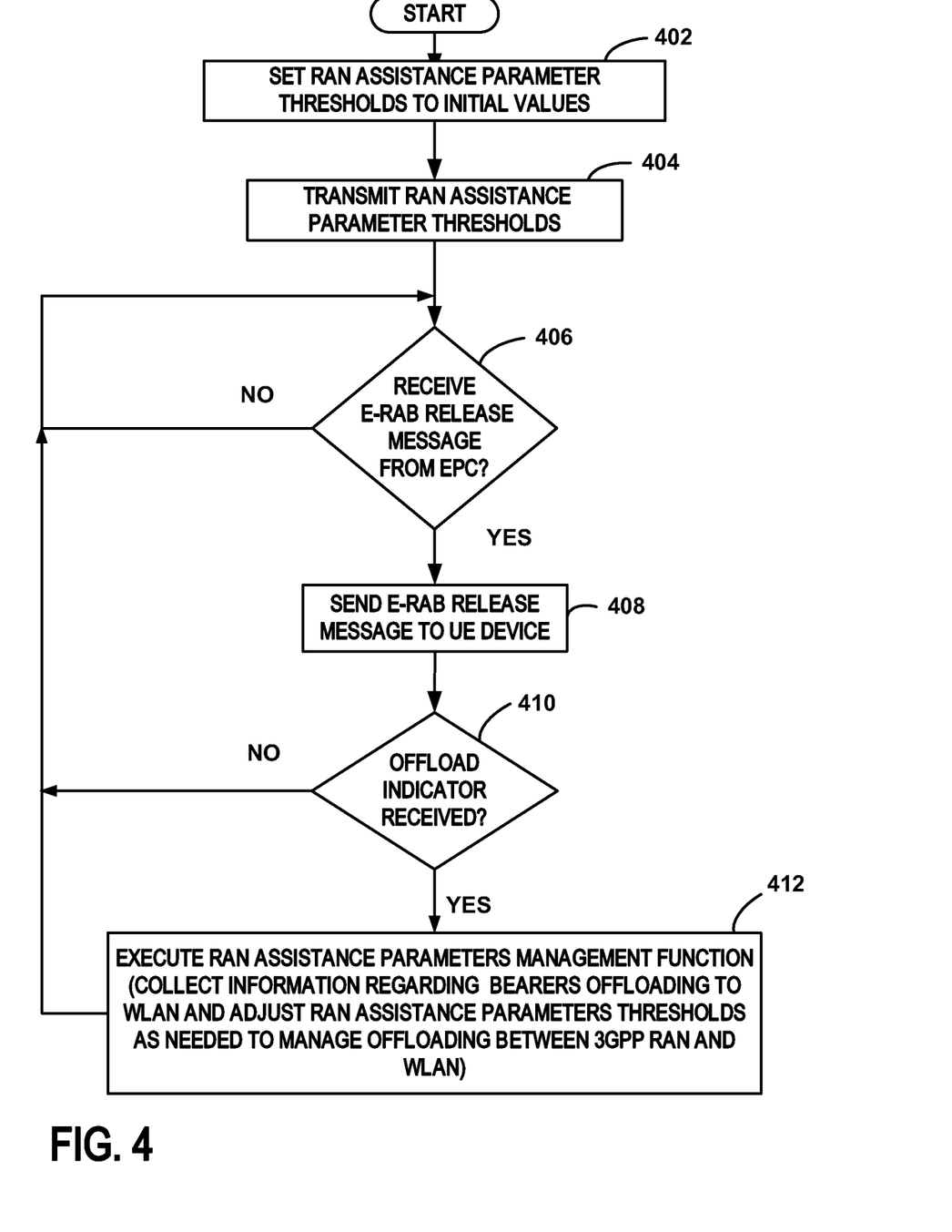
FIG. 4 is a flowchart of a method of offloading traffic performed by equipment in a 3GPP RAN.

FIG. 4 is a flowchart of a method of offloading resources performed by equipment in a 3GPP RAN. The example of FIG. 4 can be performed by the eNB 202.

At step 402, the eNB determines the initial RAN assistance parameter thresholds. For the example, a Radio Access Bearer (E-RAB) set up request is initiated by the MME and directed to the eNB. Based on the information contained in the set up request message, the eNB assigns the Data Radio Bearers to the UE device. Based on the E-RAB level QoS parameters for each E-RAB, the eNB establishes a Data Radio Bearer and allocates the required resources on the Uu interface. The RAN assistance parameter thresholds are transmitted to the UE device at step 404.

At step 406, the eNB determines if an E-RAB release message has been received from the MME 204. If an E-RAB release message has not been received, the method returns to step 406. Otherwise, the method continues at step 408.

At step 408, the eNB sends an E-RAB release message to the UE device. For the example, the eNB sends an RRC Connection Reconfiguration message to the UE device with the release message identifying the bearers to be released.

At step 410, the eNB determines whether an offload indicator has been received. For the example, the eNB evaluates the E-RAB release message received from the MME to determine whether the message included a "RAT changed from 3GPP to Non-3GPP" indicator. If the message does not include the indicator, the method returns to step 406. If an offload indicator has been received, the method continues at step 412.

At step 412, the eNB executes a RAN assistance parameter management function. For the example, the eNB collects information regarding the offloading of bearers to non-3GPP RANs and determines whether the RAN assistance parameter thresholds should be adjusted. The eNB manages the transitions between the RANs by adjusting the thresholds. The 3GPP specification defines the RAN assistance parameters for routing the UE device traffic between the 3GPP RAN and the non-3GPP RANm such as a WLAN. The eNB determines the thresholds of the parameters and provides the thresholds to the UE devices. Both low and high thresholds are provided in order to assist the UE device with network selection in both directions. The eNB provides the thresholds to UE devices either by unicast or broadcast signaling. For the examples herein, the 3GPP RAN assistance parameters include UE RSRP measurements (RSRPmeas) and UE RSRQ measurements (RSRQmeas). As is known the RSRP (Reference Signal Received Power) is received signal strength indicator (RSSI) type of measurement. The RSRQ (Reference Signal Received Quality) is a quality indicator based on the RSSI and the number of used Resource Blocks (N) RSRQ=(N*RSRP)/RSSI measured over the same bandwidth.

For the examples, the WLAN-related parameters include UE measurements of radio signal strength (BeaconRSSI), WLAN Channel Utilization (ChannelUtilizationWLAN) that is broadcast by the WLAN base station (assess point), and The WLAN backhaul downlink and uplink data rates (BackhaulRateDIWLAN, BackhaulRateUIWLAN). The UE device measures the parameters and compares the measured values to the thresholds provided by the eNB to select the appropriate RAN for routing the UE device traffic. Accordingly, by adjusting the thresholds, the eNB can manage the routing of traffic and the offloading of resources.

For the examples herein, the RAN assistance parameter function includes the criteria described below. Other criteria may be used.

When the UE device is currently routing traffic through the 3GPP RAN, the UE device offloads resources and routes traffic from the 3GPP RAN to the WLAN when the conditions of the 3GPP and WLAN parameter measurements are satisfied for a time interval (TsteeringWLAN). The 3GPP measured parameters must meet the following: The RSRP measured value is below the lower RSRP threshold or the RSRQ measured value is below the lower RSRQ threshold (RSRPmeas<thresholdRSRP-Low OR RSRQmeas<thresholdRSRQ-Low). The WLAN measured parameters must meet the following: the WLAN Channel Utilization is less than the lower WLAN Channel Utilization threshold, the WLAN downlink backhaul rate is greater than the upper WLAN downlink backhaul rate threshold, the WLAN uplink backhaul rate is greater than the upper WLAN uplink backhaul rate threshold, and the measured Beacon RSSI is greater than the upper beacon RSSI threshold (ChannelUtilizationWLAN<thresholdChannelUtilization-Low AND BackhaulRateDIWLAN>thresholdBackhaulDLBandwidth-High AND BackhaulRateUIWLAN>thresholdBackhaulULBandwidth-High AND BeaconRSSI>thresholdBeaconRSSI-High). Therefore, the UE device routes traffic through the WLAN if the RSRP or RSRQ is below the threshold and all the WLAN parameters meet the set thresholds.

When the UE device is currently routing traffic through the WLAN, the UE device offloads resources and routes traffic from the WLAN to the 3GPP RAN when the conditions of the 3GPP and WLAN parameter measurements are satisfied for a time interval (TsteeringWLAN). The WLAN measured parameters must meet the following: the WLAN Channel Utilization is greater than the upper WLAN Channel Utilization threshold or the WLAN downlink backhaul rate is less than the lower WLAN downlink backhaul rate threshold or the WLAN uplink backhaul rate is less than the lower WLAN uplink backhaul rate threshold or the measured Beacon RSSI is less than the lower beacon RSSI threshold (ChannelUtilizationWLAN>thresholdChannelUtilization-High OR BackhaulRateDIWLAN<threshold BackhaulDL-Bandwidth-Low OR BackhaulRateUIWLAN<thresholdBackhaulULBandwidth-Low OR BeaconRSSI<thresholdBeaconRSSI-Low). The 3GPP measured parameters must meet the following: The RSRP measured value is greater than the upper RSRP threshold AND the RSRQ measured value is greater that the upper RSRQ threshold (RSRPmeas>thresholdRSRP-High AND RSRQmeas>thresholdRSRQ-High). Therefore, the UE device routes traffic through the 3GPP RAN if the RSRP and RSRQ are above the respective thresholds or one of the WLAN parameters does not meet the set threshold.

Therefore, in order to steer from 3GPP to WLAN, either of the 3GPP measurements must be below its low threshold and all the WLAN measurements must be within their thresholds. To steer from WLAN to 3GPP, both of the 3GPP measurement must be above their high thresholds or one of the WLAN parameters must be out of its threshold. For this function, it can be seen that the operation is weighted toward the UE device operating in 3GPP because it will stay in 3GPP if both 3GPP measurements are within their thresholds, and the UE device will transition to 3GPP when the 3GPP thresholds are within their thresholds, regardless of the WLAN measurements. The UE device will also move to 3GPP if any of the WLAN measurements are not within their thresholds, regardless of the 3GPP measurements.

Figure 5:
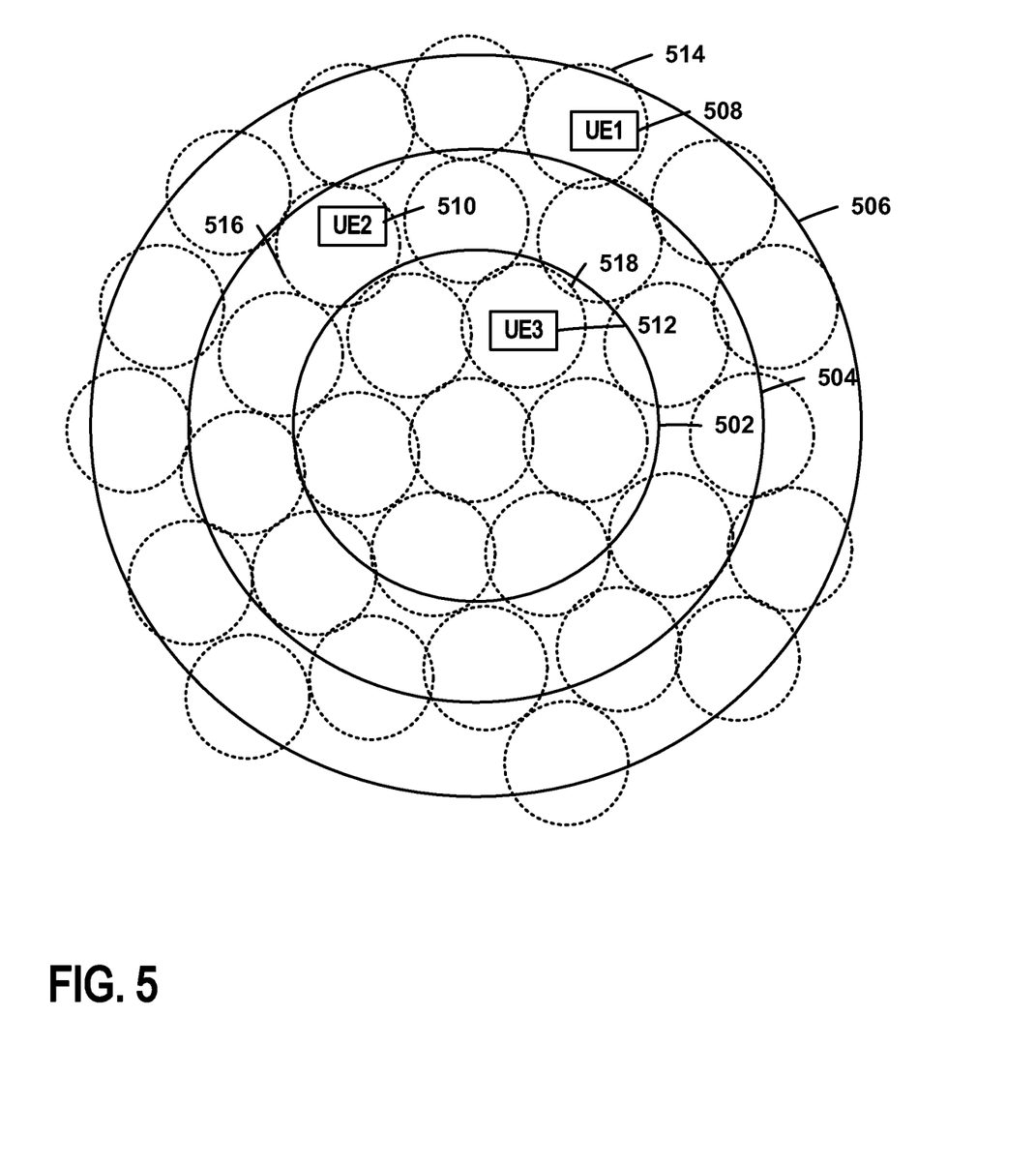
FIG. 5 is a diagram of geographical service areas for the 3GPP RAN and several WLANs for an example where WLAN thresholds are set to liberal values and the offloading of UE devices is managed by adjusting the 3GPP RAN assistance parameter thresholds.

FIG. 5 is a diagram of geographical service areas for the 3GPP RAN and several WLANs for an example where WLAN thresholds are set to liberal values and the offloading of UE devices is managed by adjusting the 3GPP RAN assistance parameter thresholds. FIG. 5, therefore, is an example of one possible strategy and others can be used. The geographical service areas can be any shape or size and can be arranged in different ways. For the example of FIG. 5, the WLAN thresholds are not triggered unless the WLAN is significantly loaded and offloading of traffic is managed by adjusting the 3GPP RSRP measurement threshold.

The eNB provides a single 3GPP cell (service area) where the signal strength is represented by three concentric circles. A first signal strength service area 502 has the highest signal strength, a second signal strength service area 504 has an intermediate signal strength, and a third signal strength service area 506 has the lowest signal strength. A first UE device 508 is within the third signal strength service area 506. A second UE device 510 is within the second signal strength service area 504 and a third UE device 512 is within the first signal strength service area 502. Several WLAN service areas overlap with the 3GPP cell including three WLAN service areas that include one of the UE devices such that the first UE device 508 is in the first WLAN service area 514, the second UE device is in the second WLAN service area 516, and the third UE device is in the third WLAN service area 518.

For the example of FIG. 5, the 3GPP RAN can initially accommodate the traffic load and no WLAN offload is required. When the eNB determines that traffic should be offloaded from 3GPP to WLAN, the eNB raises the RSRP threshold so that the RSRP measurements of the UE devices (first UE device 508) in the third signal strength service area 506 are below the new threshold and are offloaded to WLAN. To offload additional traffic, the eNB increase the RSRP threshold again so that UE devices (second UE device 510) in the second signal strength service area will be offloaded to the WLAN.

In conventional systems the UE devices make the offload decision and the eNB does not know which UE devices have been offloaded. Also, the eNB does not have information regarding the position of the UE device within the cell and does not know where the UE devices with the heaviest load are located. As a result, the eNB adjusts the RSRP threshold using trial and error until the required number of UE devices have been offloaded to reduce the 3GPP cell's traffic load to an acceptable level. For the examples herein, however, the eNB receives the traffic offload indicator and, therefore, has information regarding which UE devices have been offloaded.

Figure 6:
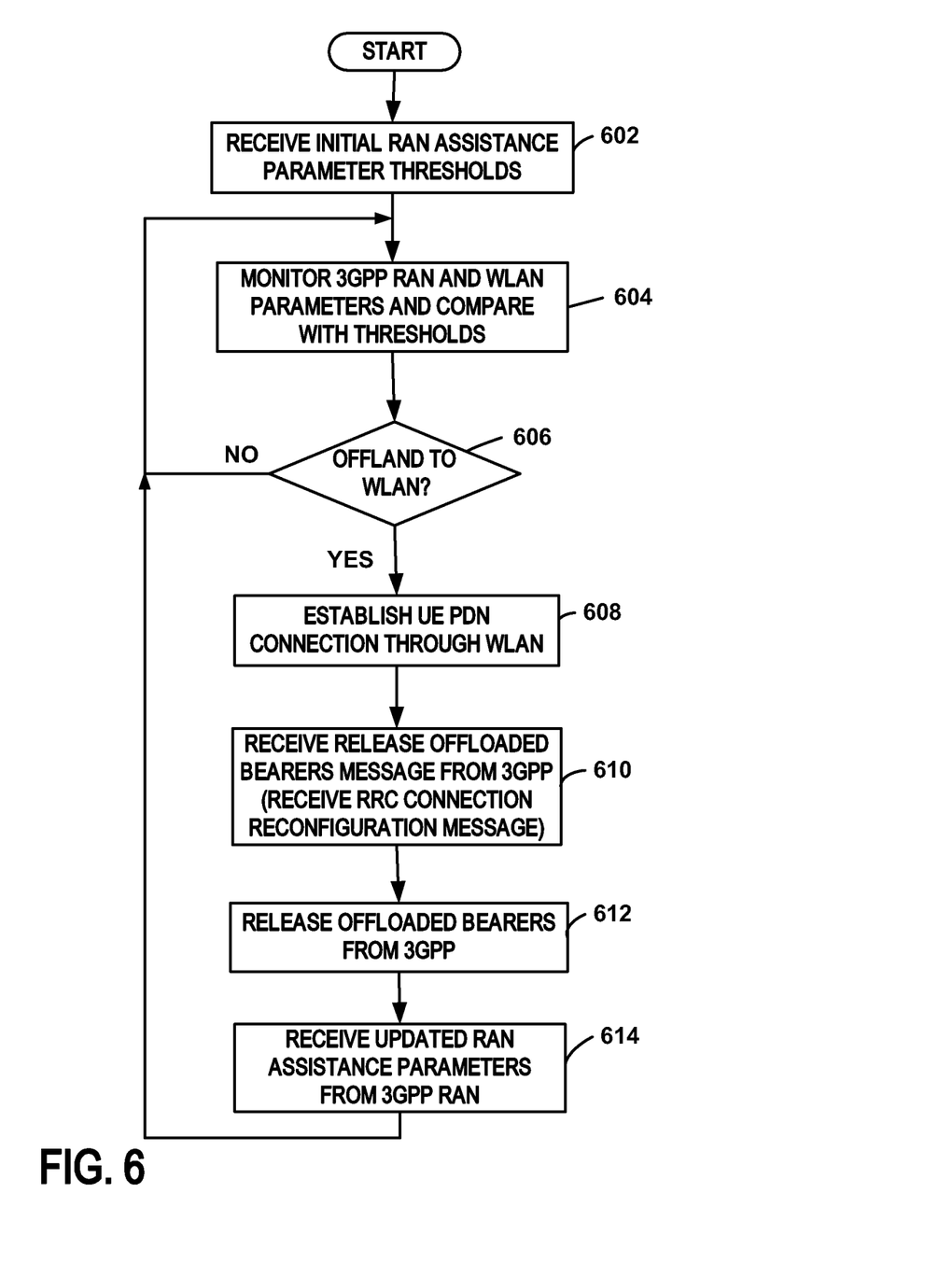
FIG. 6 is a flowchart of a method of offloading traffic performed by the UE device.

FIG. 6 is a flowchart of a method of offloading resources performed by the UE device 106.

At step 602, the UE device receives the initial RAN assistance parameter thresholds from the eNB. The thresholds provide information regarding the required characteristics of the wireless communication link and WLAN network needed for communication.

At step 604, the UE device monitors the 3GPP RAN and WLAN parameters. For the example, the UE device measures the parameters and receives information from the WLAN to determine the parameters for each RAN communication link.

At step 606, the UE device determines whether to switch to the non-3GPP RAN or to continue using the 3GPP RAN.

For the example, the UE device compares the TWAN RAN parameters to the thresholds provided by the eNB and determines whether to establish a session with the PDN through the WLAN (second RAN) 104. If the UE device determines to offload the resources to the TWAN, the method continues at step 608. Otherwise, the method returns to step 604 where the 3GPP RAN and WLAN threshold parameters are monitored.

At step 608, the UE device establishes a session with the PDN through the WLAN. For the example, the UE device initiates a session to the PDN through the WLAN by generating and sending a create session request to the PDN gateway through the WLAN RAN. After a create session response is received at the UE device, a PDN session is established through the WLAN.

At step 610, the UE device receives a release offloaded bearers message from the eNB in the 3GPP RAN. For the example, the UE device receives a RRC Connection Reconfiguration Message identifying the bearers that are being released.

At step 612, the UE device releases the offloaded bearers. In accordance with known 3GPP techniques, the UE device releases the bearers identified in the RRC reconfiguration message.

At step 614, the UE device receives updated RAN assistance parameter thresholds from the eNB. Accordingly, the criteria for offloading resources changes based on the adjustments made at the eNB.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
   providing wireless service to a user equipment (UE) device through a first radio access network (RAN) using a first radio access technology (RAT);
   receiving, at the first RAN, an offload indicator indicating that the UE device has offloaded communication resources used in the first RAN to a second RAN.

2. The method of claim 1, wherein:
   the first RAN operates in accordance with at least one version of The Third-Generation Partnership Project Long-Term Evolution (3GPP LTE) communication specification;
   the second RAN operates in accordance with a non-3GPP communication specification different from the 3GPP LTE communication specification; and
   the offload indicator is transmitted within a 3GPP Radio Access Bearer (E-RAB) Release Command.

3. The method of claim 2, wherein the receiving comprises receiving the E-RAB Release Command at an eNB from a Mobility Management Entity (MME).

4. The method of claim 2, further comprising:
   determining assistance parameter thresholds partially based on the offload indicator; and
   transmitting the assistance parameter thresholds to the UE device, the assistance parameter thresholds indicative of values used by the UE device in determining when to offload resources to another RAN.

5. The method of claim 4, wherein the determining the assistance parameter thresholds comprises applying a plurality of offload indicators received over a period of time into an assistance parameter function.

6. The method of claim 5, wherein the assistance parameter function manages migration of a plurality of UE devices between the first RAN and the second RAN.

7. The method of claim 2, wherein the second RAN is a wireless local area network (WLAN).

8. A method comprising:
   providing wireless service to a user equipment (UE) device through a 3GPP radio access network (RAN) using a first radio access technology (RAT) complying with at least one revision of The Third-Generation Partnership Project Long-Term Evolution (3GPP LTE) communication specification;
   receiving, from a Mobility Management Entity (MME) and at an eNB within the 3GPP RAN, a 3GPP Radio Access Bearer (E-RAB) Release Command comprising an offload indicator indicating that the UE device has offloaded communication resources used in the 3GPP RAN to a non-3GPP RAN using a non-3GPP RAT operating in accordance with a communication specification different than the 3GPP LTE communication specification.

9. The method of claim 8, further comprising:
   determining assistance parameter thresholds partially based on the offload indicator; and
   transmitting the assistance parameter thresholds to the UE device, the assistance parameter thresholds indicative of values used by the UE device in determining when to offload resources to another RAN.

10. The method of claim 9, wherein the determining the assistance parameter thresholds comprises applying a plurality of offload indicators received over a period of time into an assistance parameter function.

11. The method of claim 10, wherein the assistance parameter function manages migration of a plurality of UE devices between the first RAN and the second RAN.

12. The method of claim 8, wherein the second RAN is a wireless local area network (WLAN).

13. An eNB comprising:
   a wireless communication interface configured to provide wireless service to a user equipment (UE) device using a first radio access technology (RAT) complying with at least one revision of The Third-Generation Partnership Project Long-Term Evolution (3GPP LTE) communication specification;
   a network interface configured to receive, from a Mobility Management Entity (MME), a 3GPP Radio Access Bearer (E-RAB) Release Command comprising an offload indicator indicating that the UE device has offloaded communication resources used to provide the wireless service to the UE device, the offload indicator indicating that the resources are offloaded to a non-3GPP radio access network (RAN) using a non-3GPP RAT operating in accordance with a communication specification different than the 3GPP LTE communication specification.

14. The eNB of claim 13, further comprising:
   a controller configured to determine assistance parameter thresholds partially based on the offload indicator, the wireless communication interface further configured to transmit the assistance parameter thresholds to the UE device, the assistance parameter thresholds indicative of values used by the UE device in determining when to offload resources to another RAN.

15. The eNB of claim 14, wherein controller determines the assistance parameter thresholds by applying a plurality of offload indicators received over a period of time into an assistance parameter function.

16. The eNB of claim 15, wherein the assistance parameter function manages migration of a plurality of UE devices between a 3GPP RAN comprising the eNB and the non-3GPP RAN.

* * * * *